US009094240B2

(12) United States Patent
Song et al.

(10) Patent No.: US 9,094,240 B2
(45) Date of Patent: Jul. 28, 2015

(54) PASSIVE EQUALIZER AND HIGH-SPEED DIGITAL SIGNAL TRANSMISSION SYSTEM USING THE SAME

(71) Applicant: SAMSUNG ELECTRONICS CO., LTD., Suwon-si (KR)

(72) Inventors: Eak Hwan Song, Seongnam-si (KR); Young Kun Kwon, Suwon-si (KR); Won Seob Kim, Seoul (KR); Hark Byeong Park, Hwaseong-si (KR); Hyun Sik Yun, Seoul (KR); Eun Seok Hong, Suwon-si (KR); Chul Soon Hwang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/257,254

(22) Filed: Apr. 21, 2014

(65) Prior Publication Data
US 2014/0314136 A1    Oct. 23, 2014

(30) Foreign Application Priority Data

Apr. 19, 2013 (KR) .................. 10-2013-0043426

(51) Int. Cl.
| | |
|---|---|
| *H03H 7/40* | (2006.01) |
| *H04L 27/01* | (2006.01) |
| *H04B 3/14* | (2006.01) |
| *H04L 25/03* | (2006.01) |

(52) U.S. Cl.
CPC ............. *H04L 27/01* (2013.01); *H04B 3/144* (2013.01); *H04L 25/03878* (2013.01)

(58) Field of Classification Search
USPC ............................................. 375/229; 326/30
See application file for complete search history.

(56) References Cited

U.S. PATENT DOCUMENTS

| | | | |
|---|---|---|---|
| 3,659,217 A * | 4/1972 | Korn ............................. 330/175 |
| 7,737,802 B2 * | 6/2010 | Lee ............................. 333/28 R |
| 2004/0071219 A1 * | 4/2004 | Vorenkamp et al. .......... 375/257 |
| 2007/0093080 A1 * | 4/2007 | MacKillop et al. ............. 439/13 |
| 2009/0206962 A1 * | 8/2009 | Chou et al. .................. 333/28 R |
| 2009/0295514 A1 * | 12/2009 | Lee ............................. 333/28 R |
| 2010/0066452 A1 | 3/2010 | Kawashima et al. |

FOREIGN PATENT DOCUMENTS

| | | |
|---|---|---|
| EP | 2 544 369 A1 | 1/2013 |
| KR | 10-2007-0098905 | 10/2007 |

OTHER PUBLICATIONS

Kuphaldt, Tony R., "Lessons in Electric Circuits, vol. I—DC", Design Science License, Fifth Edition, Oct. 18, 2006.*

* cited by examiner

*Primary Examiner* — Dac Ha
*Assistant Examiner* — Janice Tieu
(74) *Attorney, Agent, or Firm* — Staas & Halsey LLP

(57) ABSTRACT

Disclosed herein are a passive equalizer and a high-speed digital signal transmission system, including first and second impedances connected in series to a first transfer line, third and fourth impedances connected in series to a second transfer line, a first inductor connected in parallel between the first impedance and the second impedance, a second inductor connected in parallel between the third impedance and the fourth impedance, and a resistor connected in series between the first inductor and the second inductor.

17 Claims, 7 Drawing Sheets

Frequency-response

Frequency-response

Eye-opening : 102.7 mV

Pk-pk Jitter : 75.26 ps

Eye-opening : 166.2 mV

Pk-pk Jitter : 20.83 ps

PASSIVE EQUALIZER AND HIGH-SPEED DIGITAL SIGNAL TRANSMISSION SYSTEM USING THE SAME

CROSS-REFERENCE TO RELATED APPLICATIONS

This application claims the benefit of Korean Patent Application No. 10-2013-0043426, filed on Apr. 19, 2013 in the Korean Intellectual Property Office, the disclosure of which is incorporated herein by reference.

BACKGROUND

1. Field

Embodiments of the present disclosure relate to a passive equalizer and a high-speed digital signal transmission system using the same.

2. Description of the Related Art

Recently, for reduction in the number of inputs/outputs (I/O) and cables, reduction in electromagnetic interference (EMI), and thermal reduction design concept, most methods of transmitting digital signals have used a serial link instead of a conventional parallel link.

As described above, since data, which was divided and transmitted through a variety of channels in a parallel configuration, conventionally, is transmitted through one channel, data to be transmitted per channel has increased in capacity and transmission of digital signals at high speed has developed accordingly.

SUMMARY

Therefore, it is an aspect of the present disclosure to provide a passive equalizer and a high-speed digital signal transmission system using the same, which each restore signals that have been deteriorated during transmission of high-speed digital signals, thereby reducing a bit error rate (BER) at a receiver end.

Additional aspects of the disclosure will be set forth in part in the description which follows and, in part, will be obvious from the description, or may be learned by practice of the disclosure.

In accordance with one aspect of the present disclosure, a passive equalizer includes first and second impedances connected in series to a transfer line, an inductor connected in parallel between the first impedance and the second impedance, a resistor connected in series to the inductor, and a ground connected in series to the resistor.

The first impedance may be connected to an input terminal and the second impedance may be connected to an output terminal.

A transfer function (TF) as transfer characteristics of the passive equalizer may be calculated according to Expression 1 below:

$$TF = K\left(\frac{1+s/s_1}{1+s/s_2}\right) \quad (1)$$

where K is $$\frac{2R}{Z_0 + 2R},$$

S1 is R/L, and S2 is $$\frac{Z_0 + 2R}{2L}.$$

In accordance with another aspect of the present disclosure, a passive equalizer includes first and second impedances connected in series to a first transfer line, third and fourth impedances connected in series to a second transfer line, a first inductor connected in parallel between the first impedance and the second impedance, a second inductor connected in parallel between the third impedance and the fourth impedance, and a resistor connected in series between the first inductor and the second inductor.

The first impedance may be connected to an input terminal and the second impedance may be connected to an output terminal.

The third impedance may be connected to an input terminal and the fourth impedance may be connected to an output terminal.

A transfer function (TF) as transfer characteristics of the passive equalizer may be calculated according to Expression 1 below:

$$TF = K\left(\frac{1+s/s_1}{1+s/s_2}\right) \quad (1)$$

where K is $$\frac{2R}{Z_0 + 2R},$$

S1 is R/L, and S2 is $$\frac{Z_0 + 2R}{2L}.$$

In accordance with another aspect of the present disclosure, a high-speed digital signal transmission system includes a transmitter to transmit a signal, a channel formed between the transmitter and a receiver, to transmit a frequency of a signal transmitted from the transmitter or another device, the receiver to receive and output a signal, and a passive equalizer formed between the transmitter and the receiver, to compensate for a frequency of a signal received through an input terminal along a transfer line and to equalize transfer characteristics up to a maximum frequency.

The passive equalizer having a single-ended line as the transfer line may include first and second impedances connected in series to a transfer line, an inductor connected in parallel between the first impedance and the second impedance, a resistor connected in series to the inductor, and a ground connected in series to the resistor.

The passive equalizer having differential lines as the transfer line may include first and second impedances connected in series to a first transfer line, third and fourth impedances connected in series to a second transfer line, a first inductor connected in parallel between the first impedance and the second impedance, a second inductor connected in parallel between the third impedance and the fourth impedance, and a resistor connected in series between the first inductor and the second inductor.

A transfer function (TF) as transfer characteristics of the passive equalizer may be calculated according to Expression 1 below:

$$TF = K\left(\frac{1+s/s_1}{1+s/s_2}\right) \quad (1)$$

where K is $$\frac{2R}{Z_0 + 2R},$$

S1 is R/L, and S2 is $$\frac{Z_0 + 2R}{2L}.$$

The passive equalizer may be formed between the transmitter and the channel.

The passive equalizer may be formed between the channel and the receiver.

The channel may include a first channel and a second channel, and the passive equalizer may be formed between the first channel and the second channel.

The passive equalizer may include a first passive equalizer and a second passive equalizer, the first passive equalizer may be formed between the transmitter and the channel, and the second passive equalizer may be formed between the channel and the receiver.

The high-speed digital signal transmission system may further include an active device formed between the transmitter and the receiver.

In accordance with another aspect of the present disclosure, a high-speed digital signal transmission system includes a transmitter to transmit the high-speed digital signal, a receiver to receive the high-speed digital signal and to output the received signal, and a passive equalizer formed between the transmitter and the receiver to equalize transfer characteristics of the high-speed digital signal up to a maximum frequency.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
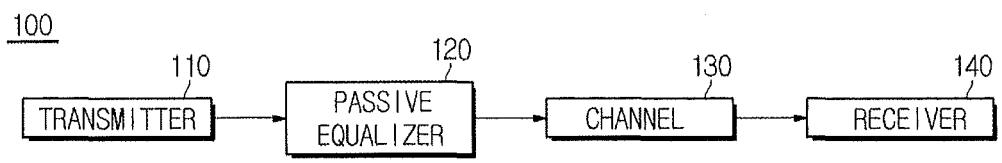
FIG. 1 is a block diagram of a high-speed digital signal transmission system according to an embodiment of the present disclosure.

Exemplary embodiments will now be described more fully with reference to the accompanying drawings to clarify aspects, features and advantages of the present disclosure. In the drawings, the same elements are denoted by the same reference numerals. In the description of the present disclosure, certain detailed explanations of related art are omitted when it is deemed that they may unnecessarily obscure the essence of the disclosure. It will be understood that, although the terms first, second, etc. may be used herein to distinguish one element from another element, these elements should not be limited by the terms.

Reference will now be made in detail to the embodiments of the present disclosure, examples of which are illustrated in the accompanying drawings.

Figure 2:
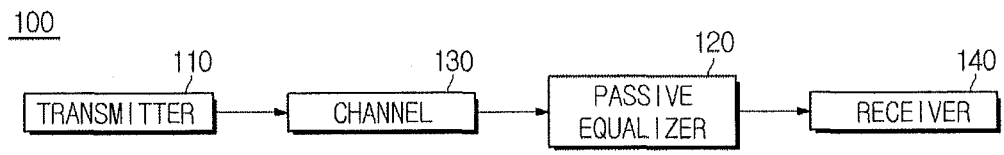
FIG. 2 is a block diagram of a high-speed digital signal transmission system according to another embodiment of the present disclosure.
Figure 3:
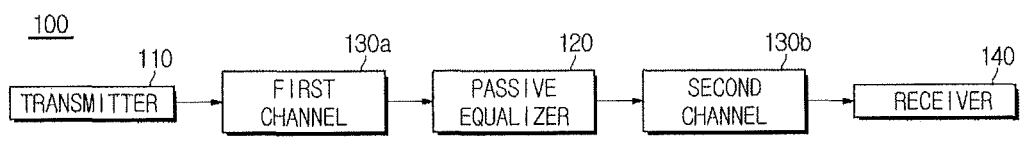
FIG. 3 is a block diagram of a high-speed digital signal transmission system according to another embodiment of the present disclosure.
Figure 4:
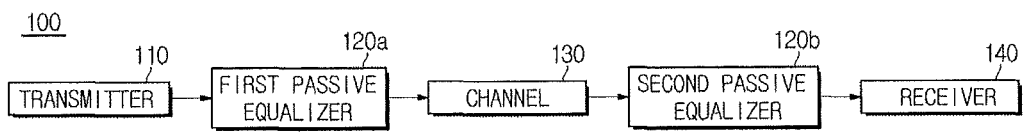
FIG. 4 is a block diagram of a high-speed digital signal transmission system according to another embodiment of the present disclosure.
Figure 5:
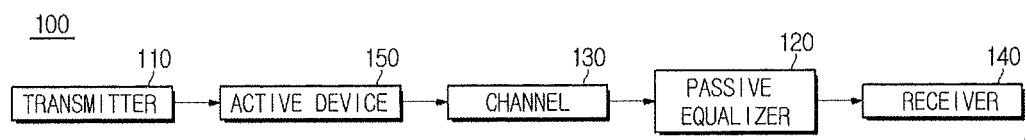
FIG. 5 is a block diagram of a high-speed digital signal transmission system according to another embodiment of the present disclosure.

FIG. 1 is a block diagram of a high-speed digital signal transmission system 100 according to an embodiment of the present disclosure. FIG. 2 is a block diagram of a high-speed digital signal transmission system 100 according to another embodiment of the present disclosure. FIG. 3 is a block diagram of a high-speed digital signal transmission system 100 according to another embodiment of the present disclosure. FIG. 4 is a block diagram of a high-speed digital signal transmission system 100 according to another embodiment of the present disclosure. FIG. 5 is a block diagram of a high-speed digital signal transmission system 100 according to another embodiment of the present disclosure.

As illustrated in FIGS. 1 through 5, the high-speed digital signal transmission system 100 may include, for example, a transmitter 110, a passive equalizer 120, a channel 130, and a receiver 140.

In more detail, the transmitter 110 may transmit a signal. In this case, the transmitter 110 may refer to a component that converts a signal, such as a, voice, music, a television (TV) image, a telegraph code, data, etc. into an electrical signal and transmits the electrical signal in the form of current transmitted through an electrical cable, a waveguide, or a line of a printed circuit board (PCB) line.

The channel 130 may be formed between the transmitter 110 and the receiver 140 and transmit or convey a frequency of a signal transmitted from the transmitter 110 or other devices. In this case, the channel 130 may be configured to transmit a signal between the transmitter 110 and the receiver 140 and may include a board, a cable, a connector, a socket, a wireless transmission medium, etc. The aforementioned devices may refer to components that are disposed upstream of the channel 130 as well as the passive equalizer 120.

The receiver 140 may receive a signal and output the signal. In this case, the receiver 140 may refer to a component to restore the received signal into sound, an image, a text, or a code and to receive the signal.

The passive equalizer 120 may be formed between the transmitter 110 and the receiver 140 and may compensate for attenuation in frequency of a signal that is received through an input terminal along a transfer line to equalize transfer characteristics up to a maximum frequency. That is, the passive equalizer 120 may compensate for frequency-dependent attenuation at a transmitter terminal or receiver terminal of a high-speed serial link used in a variety of high-performance mobile devices. In this case, the maximum frequency may refer to a frequency indicating a range from an initial frequency, which needs to be equalized. A transfer line represents a line that is formed of a conductor to transfer electric signals.

The passive equalizer 120 may be a component to restore a high-speed digital signal that has been deteriorated in a high-speed serial link in a variety of high-performance mobile devices such as a cellular phone, a personal computer (PC) a tablet PC, a notebook computer, a personal digital assistant (PDA), etc. In this regard, a passive device (e.g., a resistor, an inductor, etc.) may be used as the passive equalizer 120. In this case, the resistor may be a fixed resistor or a variable resistor. The inductor may be a component that induces a voltage in proportion to a change in current.

In general, deterioration refers to attenuation, delay distortion, noise, etc. Among these, according to embodiments of the present disclosure, deterioration may refer to attenuation. Attenuation refers to a phenomenon in which a signal is reduced in amplitude during transmission through a transmission media. Delay distortion refers to a phenomenon in which a signal is modified in form from an original signal due to different periods of time taken to transmit signals to a receiver according to frequency. In addition, noise may include thermal noise, intermodulation noise, crosstalk, echo, fading, impulsive noise, etc.

The passive equalizer 120 included in the high-speed digital signal transmission system 100 may be embodied as illustrated in FIGS. 1 through 5.

As illustrated in FIG. 1, first, the passive equalizer 120 may be formed between the transmitter 110 and the channel 130. In this case, the high-speed digital signal transmission system 100 may include the transmitter 110, the passive equalizer 120, the channel 130, and the receiver 140, which are sequentially connected to each other in the order stated.

As illustrated in FIG. 2, the passive equalizer 120 may be formed between the channel 130 and the receiver 140. In this case, the high-speed digital signal transmission system 100 may include the transmitter 110, the channel 130, the passive equalizer 120, and the receiver 140, which are sequentially connected to each other in the order stated.

As illustrated in FIG. 3, the channel 130 may include a first channel 130a and a second channel 130b. In this case, the passive equalizer 120 may be formed between the first channel 130a and the second channel 130b. Thus, the high-speed digital signal transmission system 100 may include the transmitter 110, the first channel 130a, the passive equalizer 120, the second channel 130b, and the receiver 140, which are sequentially connected to each other in the order stated.

As illustrated in FIG. 4, the passive equalizer 120 may include a first passive equalizer 120a and a second passive equalizer 120b. In this case, the first passive equalizer 120a may be formed between the transmitter 110 and the channel 130. The second passive equalizer 120b may be formed between the channel 130 and the receiver 140. Thus, the high-speed digital signal transmission system 100 may include the transmitter 110, the first passive equalizer 120a, the channel 130, the second passive equalizer 120b, and the receiver 140, which are sequentially connected to each other in the order stated.

As illustrated in FIG. 5, the high-speed digital signal transmission system 100 may further include an active device 150 formed between the transmitter 110 and the receiver 140. In this case, the high-speed digital signal transmission system 100 may include, for example, the transmitter 110, the active device 150, the channel 130, the passive equalizer 120, and the receiver 140, which are sequentially connected to each other in the order stated. However, embodiments of the present disclosure are not limited thereto. Thus, an order of arrangement of the active device 150, the passive equalizer 120 and the channel 130 may be changed as long as the active device 150, the passive equalizer 120, and the channel 130 are formed between the transmitter 110 and the receiver 140. That is, the high-speed digital signal transmission system 100 may include both the passive equalizer 120 and the active device 150. In this case, the active device 150 may refer to any component including an active device.

The arrangement structure of the passive equalizer 120 is not limited to the above structure. That is, the passive equalizer 120 may be formed between the transmitter 110 and the receiver 140 or may be formed between the transmitter 110 and the receiver 140 and may have any arrangement structure as long as the passive equalizer 120 is embodied together with the active device 150. That is, the passive equalizer 120 compensates for frequency-dependent attenuation of a digital signal transmitted through the transmitter 110 to transmit the digital signal to the receiver 140, and thus, the passive equalizer 120 may be disposed any place at which the entire channel response may be equalized.

Figure 6:
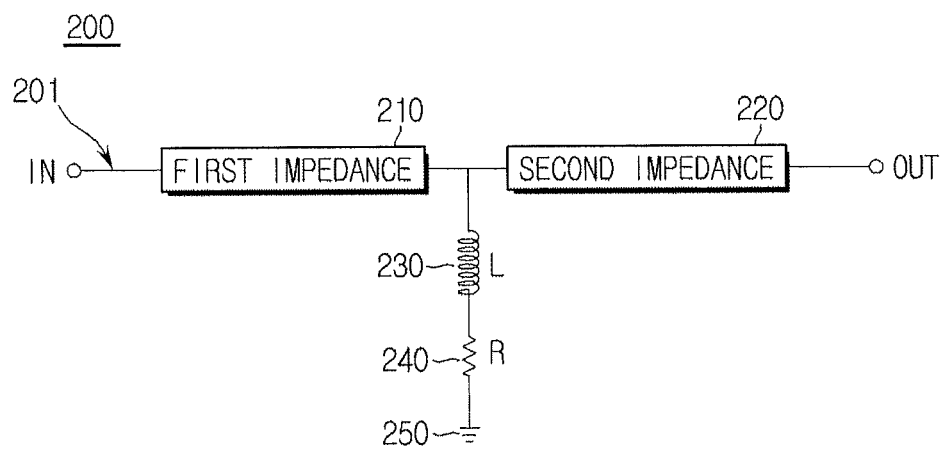
FIG. 6 is a diagram illustrating a structure of a passive equalizer having a single-ended line.

FIG. 6 is a diagram illustrating a structure of a passive equalizer 200 having a single-ended line. An example in which a transfer line 201 is a single-ended line will be described below.

As illustrated in FIG. 6, the passive equalizer 200 having a single-ended line as the transfer line 201 may include first and second impedances 210 and 220 connected in series to the transfer line 201, an inductor L 230 connected in parallel between the first impedance 210 and the second impedance 220, a resistor R 240 connected in series with the inductor L 230, and a ground 250 connected in series with the resistor R 240. That is, the inductor L 230 and the resistor R 240 may be connected in parallel to impedances (the first impedance 210 and the second impedance 220). For example, the first and second impedances 210 and 220 may be resistors, but the present invention is not limited thereto.

In this case, the first impedance 210 may be connected to an input terminal. IN and the second impedance 220 may be connected to an output terminal OUT. That is, the first impedance 210 may be formed at an input terminal side through which a signal is input to the passive equalizer 200 and the second impedance 220 may be formed at an output terminal side through which a signal is output to another component.

In addition, a transfer function TF as transfer characteristics of the passive equalizer 200 may be calculated according to Expression 1 below.

$$TF = K\left(\frac{1+s/s_1}{1+s/s_2}\right) \quad (1)$$

In Expression 1 above, K may be $$\frac{2R}{Z_0 + 2R},$$

S1 may be R/L, and S2 may be $$\frac{Z_0 + 2R}{2L}.$$

In addition, $Z_o$ may refer to impedance of a transfer line, R may refer to a resistance of a resistor, L may refer to inductance, and S, S1, and S2 may refer to frequencies.

Figure 7:
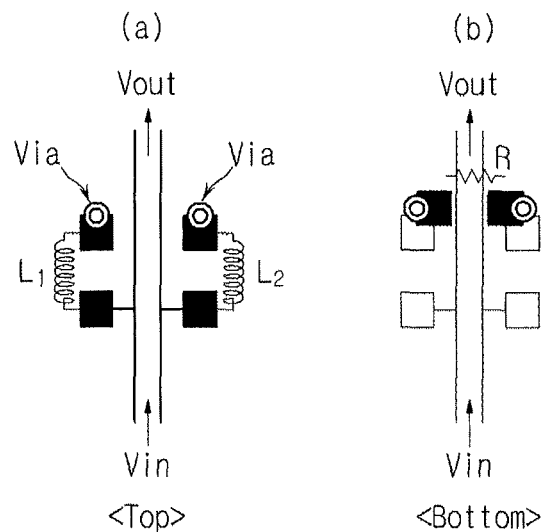
FIG. 7 is a diagram for explanation of a structure for formation of a substrate of a passive equalizer.

FIG. 7 is a diagram for explanation of a structure for formation of a substrate of a passive equalizer. An example in which transfer lines are differential lines will be described below.

As illustrated in FIG. 7, a passive equalizer having differential lines as transfer lines may be formed in such a way that a first inductor L1 and a second inductor L2 may be formed on a top surface of a substrate (Top, FIG. 7(A)) and a resistor R may be formed on a bottom surface of the substrate (Bottom, FIG. 7(B)). In this case, the first inductor L1 and the second inductor L2 that are formed on the top surface of the substrate may be electrically connected to the resistor R formed on the bottom surface of the substrate through a via formed from the top surface of the substrate to the bottom surface.

In addition, the structure for formation of the substrate of the passive equalizer is not limited to the above-described structure. For example, the first inductor L1, the second inductor L2, and the resistor R may be formed on the same plane of the substrate. In this case, the first inductor L1, the second inductor L2, and the resistor R may be electrically connected to each other on the same plane of the substrate, and thus, the aforementioned via may be omitted.

Figure 8:
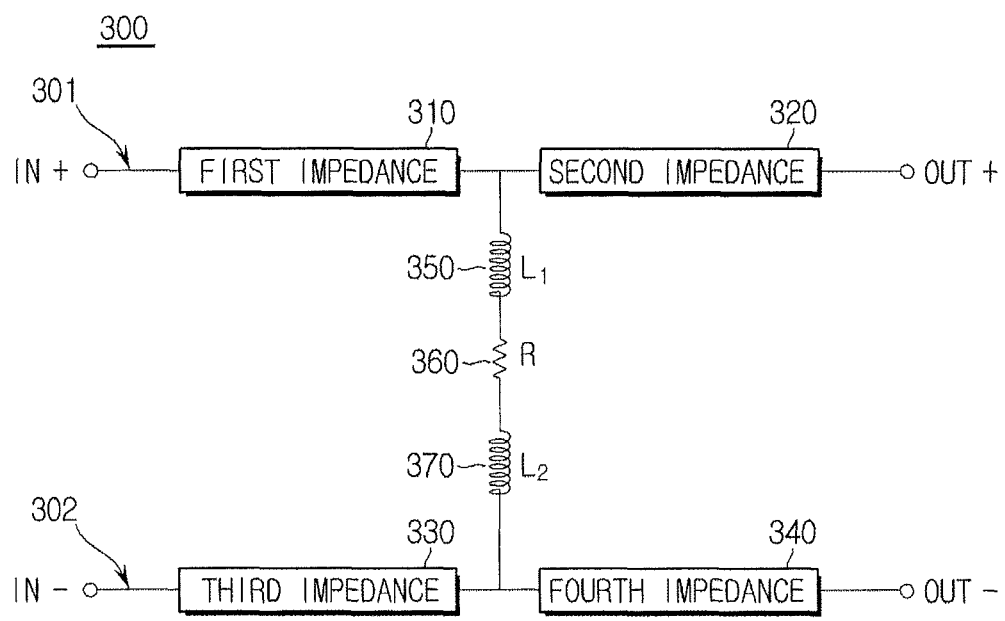
FIG. 8 is a diagram illustrating a structure of a passive equalizer having differential lines.

FIG. 8 is a diagram illustrating a structure of a passive equalizer 300 having differential lines. The structure of the passive equalizer illustrated in FIG. 7 will be described as an example.

As illustrated in FIG. 8, the passive equalizer 300 having differential lines as transfer lines may include first and second impedances 310 and 320 connected in series to a first transfer line 301, third and fourth impedances 330 and 340 connected in series to a second transfer line 302, a first inductor L1 350 connected between the first impedance 310 and the second impedance 320, a second inductor L2 370 connected in parallel between the third impedance 330 and the fourth impedance 340, and a resistor R 360 connected in series between the first inductor L1 350 and the second inductor L2 370. That is, the first inductor L1 350, the resistor R 360, and the second inductor L2 370 that are connected in series to each other may be connected in parallel to the first impedance 310, the second impedance 320, the third impedance 330, and the fourth impedance 340. In addition, the passive equalizer 300 having differential lines may be configured in such a way that a virtual ground plane may be formed on the first transfer line 301 and the second transfer line 302 to have double resistance compared with the passive equalizer 200 having a single-ended line.

The first impedance 310 may be connected to the input terminal IN and the second impedance 320 may be connected to the output terminal OUT. In addition, the third impedance 330 may be connected to the input terminal IN and the fourth impedance 340 may be connected to the output terminal OUT. That is, the first impedance 310 and the third impedance 330 may be formed at an input terminal side through which a signal is input to the passive equalizer 300 and the second impedance 320 and the fourth impedance 340 may be formed at an output terminal side through which a signal is output to another component.

In addition, the transfer function TF as the transfer characteristics of the passive equalizer 300 may be calculated according to Expression 1 above.

Figure 9:
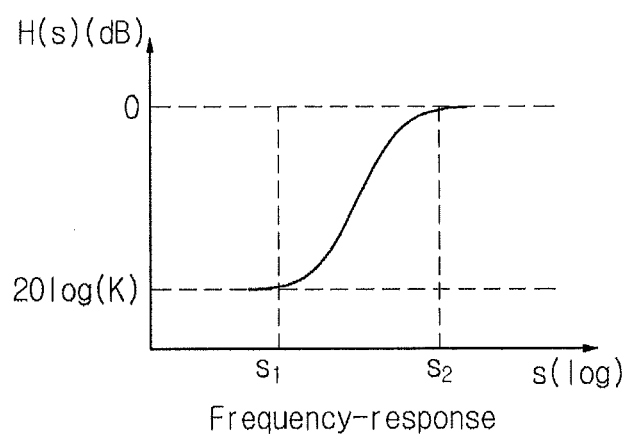
FIG. 9 is a graph illustrating a frequency response curve of a passive equalizer.

FIG. 9 is a graph illustrating a frequency response curve of a passive equalizer and illustrates a frequency response curve of the passive equalizer before the passive equalizer is applied to the high-speed digital signal transmission system 100. As seen from FIG. 9, the passive equalizer has characteristics to attenuate a low frequency overall and to relatively amplify a high frequency.

Figure 10:
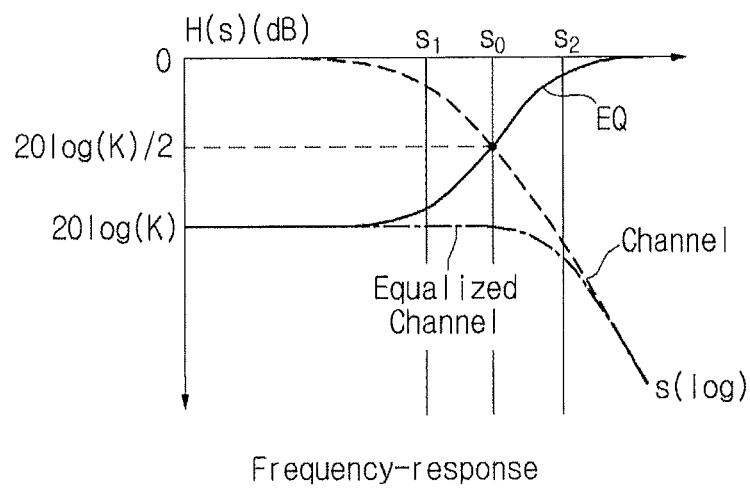
FIG. 10 is a graph for explanation of an application result of a passive equalizer.

FIG. 10 is a graph for explanation of an application result of a passive equalizer.

As illustrated in FIG. 10, a sum (Equalized Channel of FIG. 10) of a present channel response (Channel of FIG. 10) of a high-speed serial link and a frequency response (EQ of FIG. 10) of an equalizer structure may be equalized up to a maximum frequency s0. To this end, values of a resistor R and an inductor L, which are applied to the passive equalizer 120, may be set. That is, the resistance and inductance of Expression 1 above may be set such that the sum (Equalized Channel of FIG. 10) of the present channel response (Channel of FIG. 10) and the frequency response (EQ of FIG. 10) of an equalizer structure may be equalized up to the maximum frequency s0.

The aforementioned channel response may refer to a channel response of a frequency before the passive equalizer 120 is applied to the high-speed digital signal transmission system 100, the frequency response of the equalizer structure may refer to a frequency response of the passive equalizer, and the sum (Equalized Channel) of frequency response may refer to a channel response of frequency at which the passive equalizer 120 is applied to the high-speed digital signal transmission system 100.

In this case, the maximum frequency s0 up to which equalization is to be performed may be a Nyquist frequency of a digital signal to be transmitted. The Nyquist frequency is ½ of the transmitted data rate. For example, when a data rate is 10 Gbps, the Nyquist frequency may be 5 GHz.

According to embodiments of the present disclosure, as a passive equalizer is used, channel characteristics equalized up to a Nyquist frequency of a digital signal may not cause distortion of a waveform of the digital signal by maintaining signal transfer characteristics per frequency.

Figure 11:
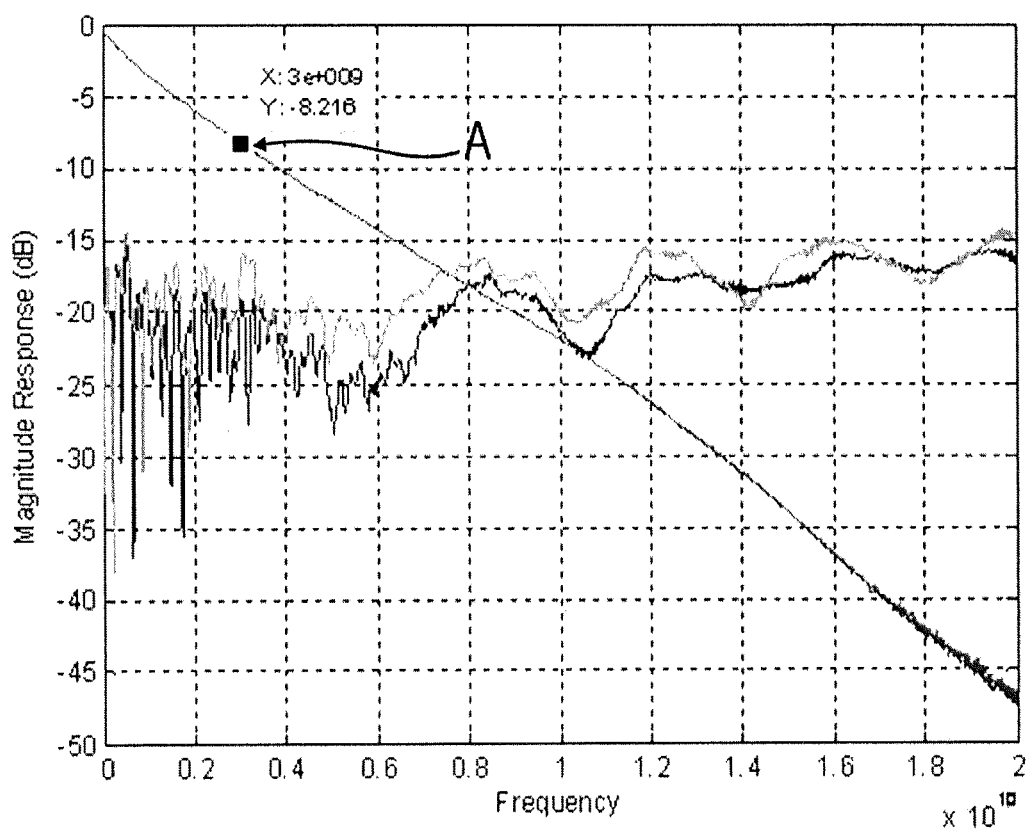
FIGS. 11, 12A and 12B are graphs for explanation of signal improvement effects after a passive equalizer is applied.

FIGS. 11 and 12 are graphs for explanation of signal improvement effects after a passive equalizer is applied.

Figure 12A:
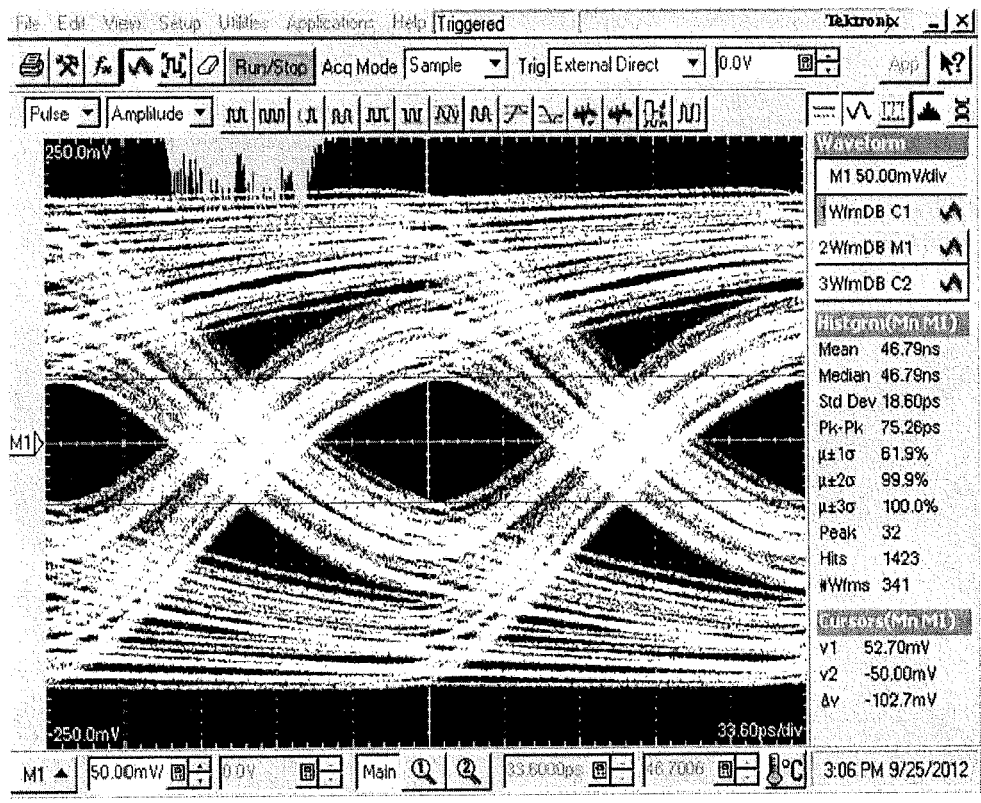
Figure 12B:
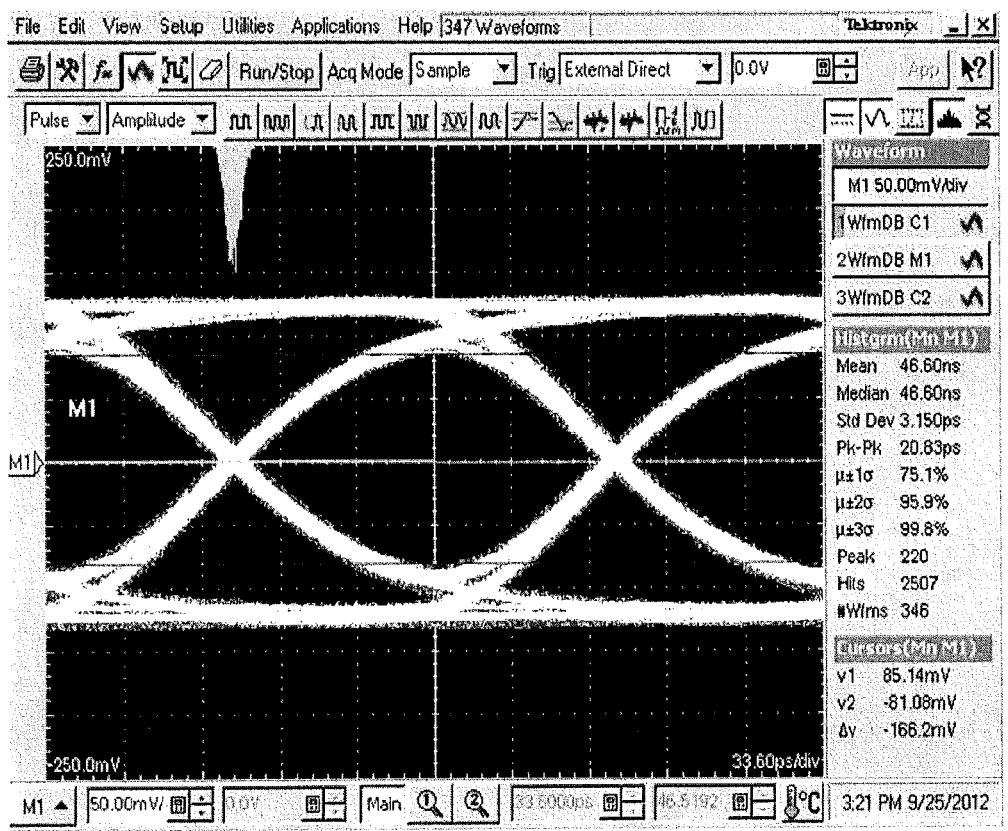

For example, when the characteristics of a printed circuit board (PCB) line having a length of 400 mm (16 inches) are those illustrated in FIG. 11, the passive equalizer 120 for equalization up to a Nyquist frequency of 3 GHz (a point A of FIG. 11) for restoration of a serial advanced technology attachment (SATA) 3.0 standard signal having a transfer speed of 6 Gbps may be designed in such a way that a resistor R has a resistance of 37.5 Ohms and an inductor L has an inductance of 16 nH. In this case, signal improvement effects before (FIG. 12A) and after (FIG. 12B) the passive equalizer is applied may be obtained as illustrated in FIG. 12.

As described above, when the passive equalizer according to embodiments of the present disclosure is applied, signals that have deteriorated during transmission of high-speed digital signals may be restored, thereby reducing a bit error rate (BER) at a receiver end.

As is apparent from the above description, a passive equalizer and a high-speed digital signal transmission system using the same may equalize channel characteristics and compensate for frequency-dependent attenuation to restore a distorted digital signal by applying the passive equalizer to a high-speed digital transmission channel, thereby increasing a receiving rate of the digital signal.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A passive equalizer comprising:
   first and second impedances connected in series to a transfer line;
   an inductor connected in parallel between the first impedance and the second impedance;
   a resistor connected in series to the inductor; and
   a ground connected in series to the resistor,
   wherein a transfer function (TF) as transfer characteristics of the passive equalizer is calculated according to Expression 1 below:

$$TF = K\left(\frac{1+s/s_1}{1+s/s_2}\right) \quad (1)$$

where K is $$\frac{2R}{Z_0 + 2R},$$

$S_1$ is R/L, and $S_2$ is $$\frac{Z_0 + 2R}{2L}$$

and where $Z_o$ is an impedance of a transfer line, R is a resistance, L is an inductance, and S, S1, and S2 are a first, second, and third frequency, respectively.

2. The passive equalizer according to claim 1, wherein the first impedance is connected to an input terminal and the second impedance is connected to an output terminal.

3. A passive equalizer comprising:
   first and second impedances connected in series to a first transfer line;
   third and fourth impedances connected in series to a second transfer line;
   a first inductor connected in parallel between the first impedance and the second impedance;
   a second inductor connected in parallel between the third impedance and the fourth impedance; and
   a resistor connected in series between the first inductor and the second inductor,
   wherein a transfer function (TF) as transfer characteristics of the passive equalizer is calculated according to Expression 1 below:

$$TF = K\left(\frac{1+s/s_1}{1+s/s_2}\right) \quad (1)$$

where K is $$\frac{2R}{Z_0 + 2R},$$

$S_1$ is R/L, and $S_2$ is $$\frac{Z_0 + 2R}{2L}$$

and where $Z_o$ is an impedance of a transfer line, R is a resistance, L is an inductance, and S, S1, and S2 are a first, second, and third frequency, respectively.

4. The passive equalizer according to claim 3, wherein the first impedance is connected to an input terminal and the second impedance is connected to an output terminal.

5. The passive equalizer according to claim 3, wherein the third impedance is connected to an input terminal and the fourth impedance is connected to an output terminal.

6. A high-speed digital signal transmission system comprising:
   a transmitter to transmit a first signal;
   a receiver to receive a second signal and to output the second signal;
   a channel, formed between the transmitter and the receiver, to convey the first signal transmitted from the transmitter; and
   a passive equalizer formed between the transmitter and the receiver, to compensate for a frequency of a third signal received through an input terminal along a transfer line and to equalize transfer characteristics of the third signal up to a maximum frequency,
   wherein a transfer function (TF) as transfer characteristics of the passive equalizer is calculated according to Expression 1 below:

$$TF = K\left(\frac{1+s/s_1}{1+s/s_2}\right) \quad (1)$$

where K is $$\frac{2R}{Z_0 + 2R},$$

$S_1$ is R/L, and $S_2$ is $$\frac{Z_0 + 2R}{2L}$$

and where $Z_o$ is an impedance of a transfer line, R is a resistance, L is an inductance, and S, S1, and S2 are a first, second, and third frequency, respectively.

7. The high-speed digital signal transmission system according to claim 6, wherein the passive equalizer includes a single-ended line as the transfer line and comprises:

first and second impedances connected in series to the transfer line;
an inductor connected in parallel between the first impedance and the second impedance;
a resistor connected in series to the inductor; and
a ground connected in series to the resistor.

8. The high-speed digital signal transmission system according to claim 6, wherein the passive equalizer includes differential lines as the transfer line and comprises:
first and second impedances connected in series to a first transfer line;
third and fourth impedances connected in series to a second transfer line;
a first inductor connected in parallel between the first impedance and the second impedance;
a second inductor connected in parallel between the third impedance and the fourth impedance; and
a resistor connected in series between the first inductor and the second inductor.

9. The high-speed digital signal transmission system according to claim 6, wherein the passive equalizer is formed between the transmitter and the channel.

10. The high-speed digital signal transmission system according to claim 6, wherein the passive equalizer is formed between the channel and the receiver.

11. The high-speed digital signal transmission system according to claim 6, wherein the channel comprises a first channel and a second channel, and
wherein the passive equalizer is formed between the first channel and the second channel.

12. The high-speed digital signal transmission system according to claim 6, wherein the passive equalizer comprises a first passive equalizer and a second passive equalizer,
wherein the first passive equalizer is formed between the transmitter and the channel, and
wherein the second passive equalizer is formed between the channel and the receiver.

13. The high-speed digital signal transmission system according to claim 6, further comprising an active device formed between the transmitter and the receiver.

14. A high-speed digital signal transmission system comprising:
a transmitter to transmit the high-speed digital signal;
a receiver to receive the high-speed digital signal and to output the received signal; and
a passive equalizer formed between the transmitter and the receiver to equalize transfer characteristics of the high-speed digital signal up to a maximum frequency,
wherein a transfer function (TF) as transfer characteristics of the passive equalizer is calculated according to Expression 1 below:

$$TF = K\left(\frac{1+s/s_1}{1+s/s_2}\right) \quad (1)$$

where K is $$\frac{2R}{Z_0 + 2R},$$

$S_1$ is R/L, and $S_2$ is $$\frac{Z_0 + 2R}{2L}$$

and where $Z_o$ is an impedance of a transfer line, R is a resistance, L is an inductance, and S, S1, and S2 are a first, second, and third frequency, respectively.

15. The high-speed digital signal transmission system according to claim 14, wherein the passive equalizer is configured to compensate for frequency-dependent attenuation of the high-speed digital signal, which is received along a transfer line.

16. The high-speed digital signal transmission system according to claim 14, wherein the passive equalizer includes a single-ended line as the transfer line and comprises:
first and second impedances connected in series to a transfer line;
an inductor connected in parallel between the first impedance and the second impedance;
a resistor connected in series to the inductor; and
a ground connected in series to the resistor.

17. The high-speed digital signal transmission system according to claim 14, wherein the passive equalizer includes differential lines as the transfer line and comprises:
first and second impedances connected in series to a first transfer line;
third and fourth impedances connected in series to a second transfer line;
a first inductor connected in parallel between the first impedance and the second impedance;
a second inductor connected in parallel between the third impedance and the fourth impedance; and
a resistor connected in series between the first inductor and the second inductor.

* * * * *